United States Patent [19]
Koetsch et al.

[11] 3,873,903
[45] Mar. 25, 1975

[54] VOLT-SECOND BALANCING MEANS FOR A HIGH FREQUENCY SWITCHING POWER SUPPLY

[75] Inventors: Philip W. Koetsch; Joseph C. Jensen, both of San Diego, Calif.

[73] Assignee: The National Cash Register Company, Dayton, Ohio

[22] Filed: Feb. 15, 1974

[21] Appl. No.: 443,941

[52] U.S. Cl............... 321/2, 321/18, 323/17, 331/113 A
[51] Int. Cl........ H02m 7/20, G05f 1/56, G05f 1/64
[58] Field of Search............ 321/2, 14, 16, 18, 9 A; 331/113 A; 323/17, DIG. 1

[56] References Cited
UNITED STATES PATENTS

| | | | |
|---|---|---|---|
| 3,490,028 | 1/1970 | Modiano............................. | 321/2 |
| 3,657,631 | 4/1972 | Martens et al...................... | 321/2 |
| 3,710,229 | 1/1973 | Jessee................................. | 321/9 A |
| 3,737,756 | 6/1973 | Hasley et al....................... | 321/2 |
| 3,829,794 | 8/1974 | Gautherin........................... | 321/2 X |

Primary Examiner—Gerald Goldberg
Attorney, Agent, or Firm—J. T. Cavender; James H. Phillips

[57] ABSTRACT

In order to prevent potentially catastrophic overheating of power switching transistors driving the transformer primary winding in a high frequency inverter power supply, which overheating is a consequence of insidious movement along the B-H curve of the transformer resulting in unbalanced primary winding currents, the currents passing through the switching transistors are differentially compared to develop a signal representative of the imbalance. This error signal is utilized to alter the duty cycle of the drive to one side only of the primary winding. Actual, or tendency toward, core saturation is thereby avoided such that less conservatively rated components may be utilized while failure due to overheating as a result of current imbalance in the inverter transformer primary is avoided.

This abstract is not to be taken either as a complete exposition of or as a limitation on the present invention. The full nature and extent of the invention may only be discerned by reference to the entire disclosure.

2 Claims, 1 Drawing Figure

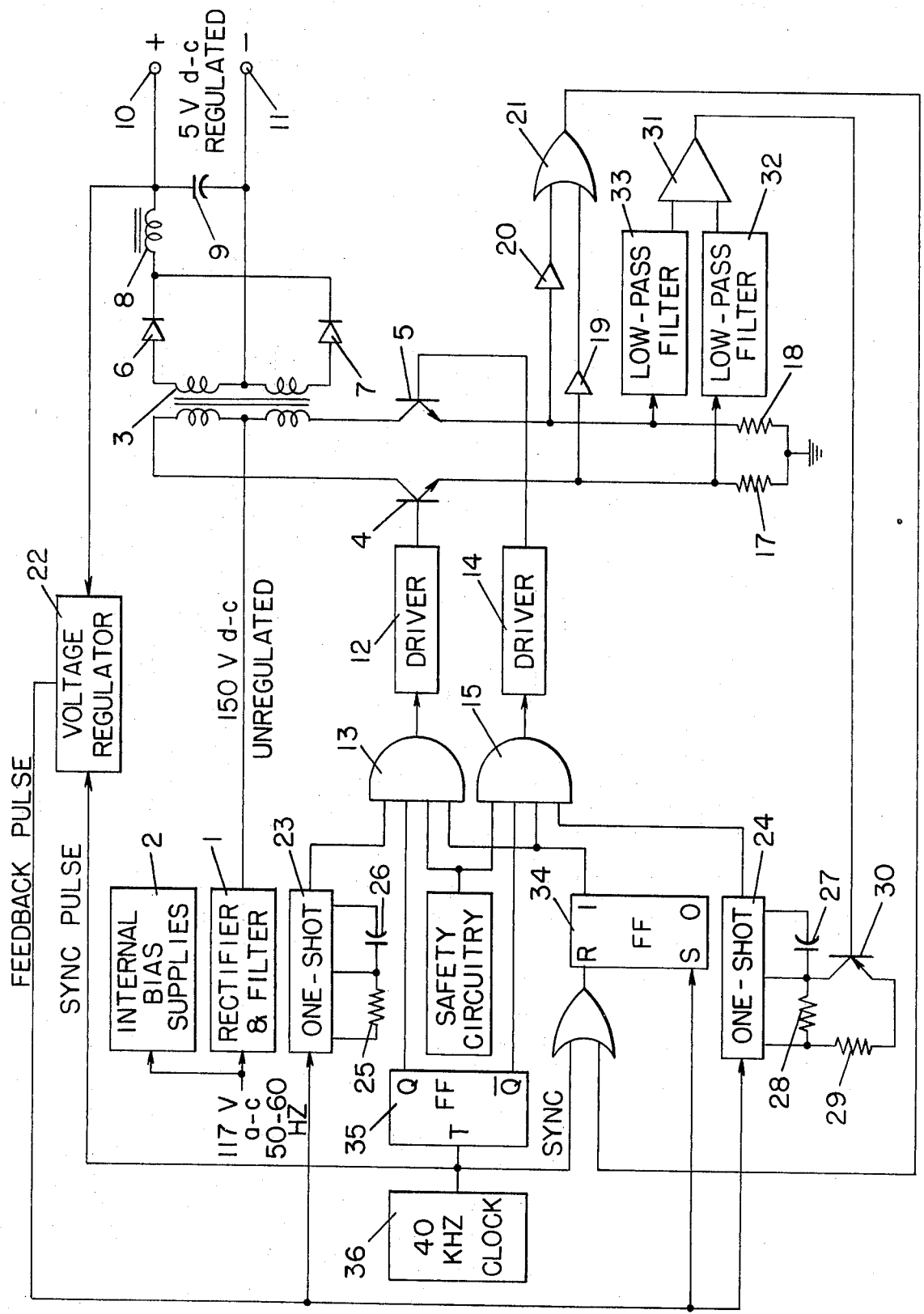

VOLT-SECOND BALANCING MEANS FOR A HIGH FREQUENCY SWITCHING POWER SUPPLY

This invention relates to electronic voltage regulators, and more particularly, to high frequency switching regulators.

Data processing equipment consumes considerable electrical energy which must be provided at one or more relatively low voltage levels. Further, the power supplies providing this energy must be well regulated in order to avoid the introduction of data errors into the equipment which it energizes due to abrupt changes in the supply voltage and to transients which may be classified as noise.

Traditionally, a conventional power supply capable of providing well regulated low voltage, high current energy to a data processing unit has generally comprised an input stepdown transformer coupled to a 50/60 cycle source; a high current, low voltage rectifier and filter; and a pass regulator which has been more often disposed in the series configuration than the shunt configuration. Differential comparison between the output voltage and a reference voltage has been the basis for a closed loop drive of the pass transistor or bank of transistors. This classical approach offers excellent regulation, ripple, and dynamic response characteristics.

However, because of the necessity for a massive input transformer and the direct regulation of high current, the traditional power supply of the class is very large, very heavy, and very inefficient, generating considerable heat which not only represents energy loss in itself, but also requires special cooling provisions.

These inherent drawbacks have become acute, rather than chronic, with the increasing use of the large scale integration techniques which are characteristic of the present, and certainly future, generation of data processing equipment. The extraordinary decrease in physical size of the data processing circuits themselves has brought into contrast the relative massiveness of the power supplies required for energizing the circuits. Attention has therefore been directed to high frequency switching power supplies which promise dramatic reduction of the bulk and heat loss which characterize the prior art supplies.

In a high frequency switching power supply, electrical energy from a source line is rectified and filtered directly to obtain a d-c unregulated voltage of, for example, approximately 150 volts. The 150 volts is applied directly to a primary winding center tap of a high frequency inverter transformer. Switching transistors coupled to the two primary winding ends are driven to alternately conduct at a relatively high frequency, e.g., 20 khz, rate to induce a low voltage, high current signal into the inverter transformer secondary. This signal may be rectified and filtered to provide the desired power. Regulation is achieved by monitoring the output voltage and appropriately adjusting the duty cycles of the switching transistors.

It will be immediately seen that the two primary objections to the classical power supply have been eliminated. First, rather than a 50/60 hz stepdown transformer, a 20 khz transformer is utilized. Thus, a transformer with a very much smaller core may be used. Second, regulation is effected on the high voltage, low current side of the system rather than the low voltage, high current side such that the regulating system need not directly handle high current. Heat losses are therefore radically reduced.

The use of high frequency techniques requires considerable care in the design and selection of the components, particularly the inverter transformer and the switching transistors. Only recently have reasonably priced switching transistors become available which can handle the voltage stress, well in excess of 400 volts in the example, to which they are subjected. However, a certain obscure problem related to the behavior of transformers can cause severe overheating and even catastrophic failure when one skilled in the art would be justified in believing that all components in a power supply are operating conservatively. It has been found that a modest imbalance of the volt-seconds applied to the two halves of inverter transformer primary winding, whether resulting from very slight differences in the pulse width of the drive to the power transistors, from slight differences in the primary winding halves, or from other slight differences in the two primary drive systems, results in an insidious translation along the B-H curve of the transformer core until one side is driven into saturation. Core saturation causes the corresponding power switching transistors to draw excessive current that can increase collector dissipation to destructive levels.

It is solving this elusive, but very serious, problem to which our invention is directed. The prior art approach, when the problem has even been recognized, has been to over-design the inverter switching transistors or to use selectively matched component delay times. These approaches obviously result in a decrease in efficiency, an increase in cost and an increase in size and weight beyond what would be expected from the utilization of high frequency switching techniques while still not fully dealing with the problem. Thus, those skilled in the art will particularly appreciate the desirability of providing a high frequency switching power supply in which no such size, cost and efficiency penalty is paid as a result of volt-second imbalance in the primary winding halves of the inverter transformer and in which danger of catastrophic failure from this source is eliminated.

It is therefore a broad object of our invention to provide an improved high frequency switching power supply.

It is a more specific object of our invention to provide such a power supply in which the deleterious effects of volt-second imbalance in the primary windings of the inverter transformer are eliminated.

In another aspect, it is an object of our invention to provide such means by the use of which the theoretical efficiency and size advantages of a high frequency switching power supply are realized without compromise due to effect of the aforementioned volt-second imbalance.

Briefly, these and other objects of the invention are achieved by differentially monitoring the currents flowing through the power switching transistors on the two sides of the inverter transformer drive to develop an error signal indicative of any differences therebetween, which error signal is utilized to alter, independent of the voltage regulation system, the duty cycle of one side only of the primary drive.

The subject matter of the invention is particularly pointed out and distinctly claimed in the concluding portion of specification. The invention however, both as to organization and method of operation, may best be understood by reference to the following detailed description taken with reference to the accompanying drawing of which the single FIGURE is a block diagram of an exemplary high frequency switching power supply incorporating the principles of the present invention.

Referring now to the single FIGURE, it will be observed that much of the system illustrated thereby is in accordance with contemporary practice in the high frequency switching power supply art. A rectifier and filter 1 is coupled directly to a nominal 117 volt a-c source to develop an unregulated output of approximately 150 volts d-c. An internal bias power unit 2 is also energized directly from the 117 volt a-c line and consists of the circuits necessary for energizing and biasing the control elements within the switching power supply.

The 150 volts d-c is applied to the center tap of the primary winding of a high frequency switching transformer 3. Current paths are established, alternately, in the primary winding halves of the transformer 3 by the correspondingly alternate switching action of power switching transistors 4 and 5. As will become more apparent as the description of the system proceeds, this switching action is carried out at an ultrasonic rate, 20 khz in the example, in order to induce a high current, low voltage signal into the secondary winding of the transformer 3. The signal appearing across the secondary winding of the transformer 3 is full wave rectified by the power rectifiers 6 and 7 and filtered by series choke 8 and shunt capacitor 9 to provide nominally 5 volts d-c across the output terminals 10 and 11, the latter terminal being common.

Those skilled in the art will understand that the power switching transistors 4 and 5 may, in practice, each comprise a parallel bank of transistors, the number depending upon the current requirements of the system. The power switching transistor 4 is selectively enabled by driver circuit 12 which responds to a pulse from AND gate 13, which pulse is delivered each time AND gate 13 is fully enabled, i.e., all its inputs are simultaneously at a predetermined logic level. Similarly, power switching transistor 5 is selectively enabled by driver circuit 14 which, in turn, responds to each pulse issued by AND gate 15, which pulse is present when AND gate 15 is fully enabled.

It will be observed that each of the AND gates 13 and 15 are provided with 4 inputs, 2 of which are common. Conventional safety circuits, represented by the block 16, are internally OR'ed together and issue a single output signal which maintains corresponding input legs of the AND gates 13 and 15 in the enabled state in the absence of abnormal conditions such as heatsink overtemperature, input over-voltage, output over-voltage, loss of bias, etc. Thus, during normal operation, these input legs of the AND gates 13 and 15 are maintained in the enabled state, and if an abnormal condition occurs, these legs switch to the opposite state to prevent the AND gates 13 and 15 from issuing further pulses to the drivers 12 and 14 until the abnormal condition has been corrected.

A pair of matched resistors 17 and 18 are serially disposed in the emitter current paths of the power switching transistors 4 and 5, respectively. These resistors have a relatively low resistance value and high current rating, e.g., 0.1 ohms and 10 watts. The principal function of the resistors 17 and 18 will be discussed in conjunction with the volt-second balancing feature of the present system. However, they also serve as short term detectors to afford dynamic over-current protection to the power switching transistors 4 and 5. The voltage appearing at the emitter electrodes of the power switching transistors is indicative of the instantaneous currents through the respective resistors 17 and 18. These voltage signals are applied respectively to threshold comparators 19 and 20 which are selected to issue an output capable of enabling an OR gate 21 only when the current through one or the other, or both, of the resistors 17 and 18 exceeds a predetermined limit.

The output from the OR gate 21 coupled to the reset input of cross coupled flip-flop 34 which has its 1 output connected to input legs of the AND gates 13 and 15. Thus, if a transient overcurrent condition enables OR gate 21, flip-flop 34 is locked in the reset state to disable the AND gates 13 and 15 and kill the drive to the power switching transistors.

Basic timing for the system is derived from a 40 khz clock 36 which may be a simple UJT relaxation oscillator. The output signal from the clock 36 is applied to the clock input of a JK flip-flop 35 which performs a frequency division of two and therefore issues a 20 khz square wave from its Q output and an inversion therof on its $\overline{Q}$ output. The Q and $\overline{Q}$ output terminals of the flip-flop 35 are coupled as third inputs, respectively, to the AND gates 13 and 15.

Normal voltage regulation is carried out by issuing a sync signal from the clock 36 to the voltage regulator 22 which also receives a voltage signal from the output terminal 10 of the power supply. In response to the sync pulse and after a delay of duration directly related to the voltage level observed at the output terminal 10, the voltage regulator 22 issues a pulse to monostable multivibrators 23 and 24 to institute a cycle of operation in each.

In order to achieve reference point electrical isolation between the output and the control circuits within the power supply, it is desirable that photocoupling techniques be utilized within the voltage regulator 22. Thus, the sync pulse may be introduced within the voltage regulator 22 to initiate generation of a ramp function through a light emitting diode/photosensitive diode couple. Similarly, the instant at which the ramp reaches a predetermined reference level within the voltage regulator 22 is reflected through a light emitting diode/photosensitive diode couple to the monostable multivibrators 23 and 24.

The voltage regulator output pulse is also applied to the set input of flip-flop 34, thereby setting the flip-flop and enabling the input legs of AND gates 13 and 15 to which the 1 output is connected. Previously, during normal operation, the flip-flop 34 will have been reset by a clock pulse applied to its reset input to temporarily disable AND gates 13 and 15. Thus, assuming no abnormal conditions, AND gate 13 will be fully enabled only when monostable multibrator 23 has timed out and the $\overline{Q}$ output from flip-flop 35 is in the high state. Similarly, AND gate 15 will be fully enabled only when monostable multivibrator 24 has timed out and the Q output of the flip-flop 35 is in the high state. Since the one of AND gates 13 and 15 which has been enabled becomes disabled when the next succeeding clock pulse resets flip-flop 34, it will be seen that the period of drive to the corresponding switching transistor 4 or 5 extends from the time the corresponding monostable multivibrator 23 or 24 times out until the next clock pulse occurs, and the voltage regulation is effected by adjustment of the former.

The delay through the monostable multivibrator 23 is constant and is a function of the component values of timing resistor 25 and timing capacitor 26. Monostable multivibrator 24 is also provided a fixed timing capacitor 27. Its timing resistance, however, is a combination of a fixed resistor 28 disposed in parallel with a series circuit comprising a fixed resistor 29 and transistor 30 operating as a variable resistance. The apparent resistance of the transistor 30 is controlled by the output signal from a differential amplifier 31 applied to the base electrode of the transistor 30. The differential inputs to the differential amplifier 31 are obtained from the emitter electrodes of the power switching transistors 4 and 5. These low level voltage signals are developed across precision resistors 17 and 18 and are therefore representative of the current through each side of the high frequency switching transformer 3.

It is not desirable, however, to apply these signals directly to differential amplifier 31 inasmuch as an integration of several hundred cycles, rather than instantaneous response, is desired. Thus, the signals are averaged in low pass filters 32 and 33, respectively, to achieve the desired processing before application to the input terminals of the differential amplifier 31. The components are selected such that, when the differential amplifier 31 observes no difference between the level of its input signals, the resistance network comprising the resistors 28 and 29 and the transistor 30 closely approximates the value of the resistor 25 whereby the delay through the monostable multivibrators 23 and 24 is the same.

However, if a trend is observed, for example, toward increased current through the switching transistor 5 as indicated by an increased voltage detected at the emitter therof, this trend results in an increased voltage signal issuing from the low pass filter 33 to the corresponding terminal of the differential amplifier 31. The output signal from the differential amplifier 31 responds by becoming more positive than normal to increase the apparent resistance of the transistor 30 and hence the timing resistance of the monostable multivibrator 24. As a result, complete enablement of AND gate 15 is slightly delayed from normal to correspondingly delay the leading edge of the drive pulses to the power switching transistor 5, thereby decreasing its duty cycle to alter the current flow through the high frequency switching transformer 3 primary winding back to a balanced volt-second state.

On the other hand, if a trend toward increased current through the power switching transistor 4 is detected, the increased voltage observed at its emitter electrode is processed through the low pass filter 32, and the differential amplifier 31 responds by issuing a more negative than normal output to reduce the apparent resistance of the transistor 30 and hence the timing resistance of the monostable multivibrator 24. Consequently, the AND gate 15 is enabled slightly earlier to increase the duty cycle of the drive pulses to the power switching transistor 5 to bring the current flowing through the primary winding halves of the high frequency switching transformer 3 back into volt-second balance.

Those skilled in the art will appreciate that we have provided means for assuring such balance simply and independently of the normal voltage regulation carried out within a high frequency switching power supply.

While the principles of the invention have now been made clear in an illustrative embodiment, there will be immediately obvious to those skilled in the art many modifications of structure, arrangements, the elements, and components used in the practice of the invention which are particularly adapted for specific environments and operating requirements without departing from those principles.

We claim:

1. a high frequency switching power supply comprising:
   A. a source of d-c having a high side and a common side;
   B. a high frequency transformer including a primary winding having a center tap and first and second ends;
   C. means coupling said high side of said d-c source to said center tap;
   D. a first power switching transistor electrically disposed between said first end of said transformer and said common side of said d-c source; E. a second power switching transistor electrically disposed between said second end of said transformer and said common side of said d-c source;
   F. a clock pulse source;
   G. enabling means responsive to clock pulses for alternately developing drive pulses to said first and second power switching transistors:
   H. first and second current sensing means coupled, respectively, to said first and second power switching transistors for developing first and second current value signals corresponding to the instantaneous currents therethrough;
   I. compensating means responsive to the difference between the first and second current value signals to alter the duration of said drive pulses to said first power switching transistor, said compensating means including:
      i. a monostable multivibrator coupled to said enabling means to provide an enabling signal thereto when said monostable multivibrator times out, said monostable multivibrator starting a cycle of operation in response to a timing pulse derived from a clock pulse; and
      ii. a variable timing resistance, the duration of delay through said monostable multivibration being dependent upon said variable timing resistance, the valve of said variable timing resistance being responsive to the magnitude of the average difference between the first and second current value signals; and
   J. first and second integration means coupled, respectively, between said first current sensing means and said compensating means and between said second current sensing means and said compensating means whereby said compensating means responds to an average difference between the first and second current value signals.

2. The high frequency switching power supply of claim 1 in which said variable resistance comprises a transistor and in which said compensating means includes a differential amplifier for receiving the integrated first and second current value signals, the output from said differential amplifier driving said variable resistance transistor.

* * * * *